US012576833B2

(12) United States Patent
Cho

(10) Patent No.: US 12,576,833 B2
(45) Date of Patent: Mar. 17, 2026

(54) DEVICE AND METHOD OF CONTROLLING REMOTE PARKING ASSIST FUNCTION

(71) Applicants: Hyundai Motor Company, Seoul (KR); Kia Corporation, Seoul (KR)

(72) Inventor: Jin Kyeom Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 271 days.

(21) Appl. No.: 17/977,846

(22) Filed: Oct. 31, 2022

(65) Prior Publication Data

US 2023/0227023 A1 Jul. 20, 2023

(30) Foreign Application Priority Data

Jan. 17, 2022 (KR) ........................ 10-2022-0006744

(51) Int. Cl.
*B60W 30/06* (2006.01)
*B60W 50/14* (2020.01)
*G05D 1/00* (2024.01)

(52) U.S. Cl.
CPC ............ *B60W 30/06* (2013.01); *B60W 50/14* (2013.01); *G05D 1/0011* (2013.01); *B60W 2552/15* (2020.02); *B60W 2555/20* (2020.02); *B60W 2556/45* (2020.02); *B60W 2710/18* (2013.01)

(58) Field of Classification Search
CPC ................. B60W 30/06; B60W 50/14; B60W 2552/15; B60W 2555/20; B60W 2556/45; B60W 2710/18; B60W 30/08; B60W 40/02; B60W 60/001; G05D 1/0011
USPC .......................................................... 701/2
See application file for complete search history.

(56) References Cited

U.S. PATENT DOCUMENTS

| | | | |
|---|---|---|---|
| 11,126,184 B1* | 9/2021 | Konrardy | ............... G08G 1/161 |
| 2018/0043905 A1* | 2/2018 | Kim | ...................... B60W 10/20 |
| 2021/0053555 A1* | 2/2021 | Sugiyama | ............ G05D 1/0022 |
| 2022/0041162 A1* | 2/2022 | Arita | ................... B60W 30/162 |
| 2022/0089181 A1* | 3/2022 | Gross | ................... G07C 5/0841 |

(Continued)

FOREIGN PATENT DOCUMENTS

| | | | | |
|---|---|---|---|---|
| CN | 109969150 A | * | 7/2019 | ............... B60T 7/12 |
| CN | 111204228 A | * | 5/2020 | ............. B60L 15/20 |
| CN | 112896163 A | * | 6/2021 | .......... B60T 8/17555 |

(Continued)

OTHER PUBLICATIONS

Matlab, "Understanding Support Vector Machine Regression", www.mathworks.com, 2016 (Year: 2016).*

(Continued)

*Primary Examiner* — Tiffany P Young
*Assistant Examiner* — Shien Ming Chou
(74) *Attorney, Agent, or Firm* — Banner & Witcoff, Ltd.

(57) ABSTRACT

Disclosed are a device and a method of controlling a remote parking assist function capable of determining in advance whether to enter, adjustment, or cancel the remote parking assist function using direct or indirect environment information. The device for controlling a remote parking assist function may collect direct and indirect environment information on a location where a vehicle is to be parked from a surrounding-environment information source, analyze the collected information, and cause activation of at least one of an entry control function, an adjustment control function, or a cancellation control function.

19 Claims, 8 Drawing Sheets

(56)     References Cited

U.S. PATENT DOCUMENTS

2023/0104083 A1\*   4/2023   Morvan .......... G08G 1/096791

FOREIGN PATENT DOCUMENTS

KR      10-2019-0088114  A      7/2019
KR      10-2021-0062123  A      5/2021
KR      10-2021-0076707  A      6/2021

OTHER PUBLICATIONS

Cuemath, "Dot Product", https://www.cuemath.com, 2024 (Year: 2024).\*
EPermitTest "Drivers education", (Year: 2020).\*

\* cited by examiner

FIG. 2
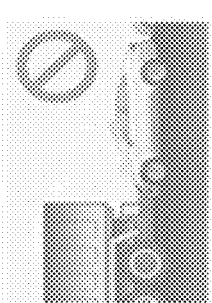
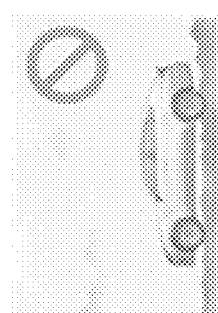
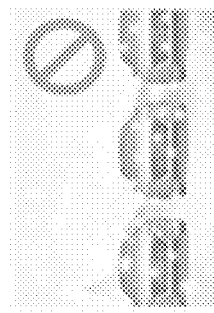
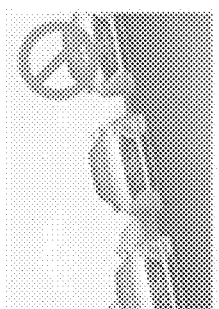

| SORTED BY | POINTS | STANDARD |
|---|---|---|
| ROAD SLOPE (%) | 1 | ROAD SLOPE > 10 OR ROAD SLOPE < -10 |
| | 2 | 10 ≥ ROAD SLOPE > 3 OR -10 ≤ ROAD SLOPE < -3 |
| | 3 | 3 ≥ ROAD SLOPE OR -3 ≤ ROAD SLOPE |
| ROAD SURFACE | 1 | ASPHALT |
| | 2 | SOIL, SAND |
| | 3 | SNOW, ICE |
| NEARBY OBJECTS | 1 | NO OBJECT WITHIN 3 METERS OF VEHICLE |
| | 2 | OBJECT WITHIN 3 METERS OF VEHICLE |
| | 3 | MOVING OBJECT WITHIN 3 METERS OF VEHICLE |
| AMBIENT LIGHT | 1 | HEADLIGHTS OFF |
| | 2 | TAILLIGHTS ON |
| | 3 | HEADLIGHTS ON |
| AMBIENT WEATHER | 1 | SUNNY |
| | 2 | RAINY |
| | 3 | SNOWY |
| AMBIENT TEMPERATURE (CELSIUS) | 1 | TEMPERATURE > +5℃ |
| | 2 | +5℃ ≥ TEMPERATURE > 0℃ |
| | 3 | 0℃ ≥ TEMPERATURE |
| PARKING LOCATION | 1 | NO HISTORY OF PARKING ACCIDENTS AT THE LOCATION |
| | 2 | THERE IS A HISTORY OF PARKING ACCIDENTS AT THE LOCATION |
| | 3 | PARKING ACCIDENT HISTORY AT THE LOCATION INDICATES MORE THAN 2 ACCIDENTS A YEAR |

FIG. 4

TORQUE (Nm)

DIFFERENTIATED - TARGET VALUE

DIFFERENTIATED-RISING SLOPE

EXISTING - TARGET VALUE

EXISTING-RISING SLOPE

TIME (Sec)

T₁    T₂

DEVICE AND METHOD OF CONTROLLING REMOTE PARKING ASSIST FUNCTION

This application claims the benefit of Korean Patent Application No. 10-2022-0006744, filed on Jan. 17, 2022, which is hereby incorporated by reference in its entirety.

BACKGROUND

Field

Embodiments relate to a remote parking assist function, and more particularly to a device and a method of controlling a remote parking assist function capable of determining in advance whether to enter, adjust, or cancel the remote parking assist function using direct or indirect environment information.

Discussion of the Related Art

A remote parking assist function is a function that enables a driver to safely park or exit from a vehicle using a smart key while the driver stays outside the vehicle. When the driver presses a remote smart parking assist function button after moving the vehicle to a parking spot, the vehicle starts searching for a space where the vehicle can be parked. After searching, the vehicle selects a parking space and determines the surrounding situation and the method of parking. When the driver puts the gear in the parking (P) position, gets out of the vehicle, and presses forward and/or reverse buttons on a smart key near the vehicle, parking proceeds.

However, when the driver does not fully check the surrounding situation before activating the remote parking assist function, the vehicle may be damaged or the driver may be injured during or after parking.

SUMMARY

The present disclosure is directed to a device and a method of controlling a remote parking assist function that substantially obviate one or more problems due to limitations and disadvantages of the related art.

This disclosure at least provides a device for controlling a remote parking assist function capable of determining in advance whether to enter, correct (e.g., adjust), or cancel the remote parking assist function using direct or indirect environment information.

Also provided is a method of controlling a remote parking assist function capable of determining in advance whether to enter, adjust, or cancel the remote parking assist function using direct or indirect environment information.

Additional advantages, objects, and features of the disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, provided is a device for controlling a remote parking assist function. The device may include one or more processors, and memory storing instructions. The instructions, when executed by the one or more processors, may cause the device to collect direct environment information and indirect environment information on a parking location; determine a combined risk score by combining at least one risk score assigned to the direct environment information and at least one risk score assigned to the indirect environment information; and based on a comparison of the combined risk score with a predetermined adjustment score and a predetermined prohibition score, cause activation of at least one of an entry control function, an adjustment control function, or a cancellation control function In another aspect of the present disclosure, provided is a method of controlling a remote parking assist function, the method including receiving a request that a remote parking assist function be performed; collecting direct environment information and indirect environment information on a parking location; determining a combined risk score obtained by combining at least one risk score assigned to the direct environment information with at least one risk score assigned to the indirect environment information; based on a comparison of the combined risk score with a predetermined adjustment score and a predetermined prohibition score, causing activation of at least one of an entry control function, an adjustment control function, or a cancellation control function.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates examples of situations in which the use of a remote smart parking assist function may be prohibited;

FIG. 4 is an example of risk scores assigned to information on the surrounding environment;

DETAILED DESCRIPTION

Figure 1:
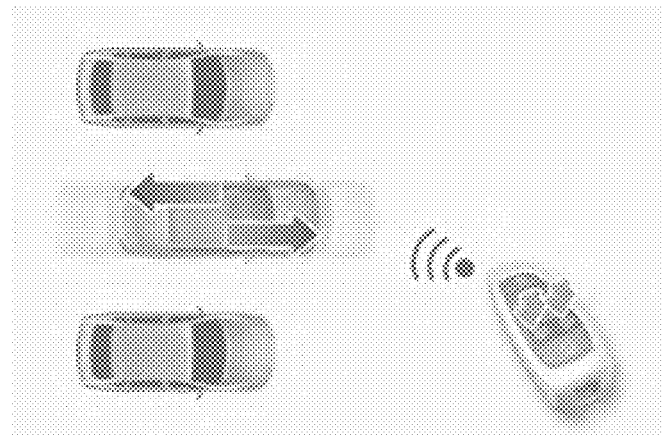
FIG. 1 shows an example scenario in which a driver presses forward and reverse buttons on a smart key outside a vehicle and the vehicle proceeds to park accordingly.

In order to fully understand the present disclosure, the operational advantages of the present disclosure, and the objects achieved by the practice of the present disclosure, reference should be made to the accompanying drawings, which illustrate exemplary embodiments of the present disclosure, and the content describing the accompanying drawings.

A description will now be given in detail of the preferred embodiments disclosed herein with reference to the accompanying drawings. Like reference numerals in each drawing indicate like members.

FIG. 1 shows an example scenario in which a driver presses forward and reverse buttons on a smart key outside the vehicle and the vehicle proceeds to park accordingly.

The remote smart parking assist function may be facilitated by ultrasonic sensors attached to the front and/or rear of the vehicle. The ultrasonic sensors may detect the locations of obstacles and enable safe parking.

FIG. 2 illustrates examples of situations in which the use of the remote smart parking assist function may be prohibited.

Referring to FIG. 2, the manufacturer of the vehicle or the manufacturer of the device that performs the remote smart parking assist function may recommend that a driver check the surrounding environment before parking if the road has a slope (first image), the road is slippery due to accumulation of snow, etc. (second image), the road surface is uneven (third image), and/or an obstacle bigger and taller than the vehicle to be parked, such as a truck, is present (fourth image). The driver may need to visually check the surrounding environment before parking when it is obvious that a problem will occur after parking due to the surrounding environment and/or due to the difficulty of parking.

Figure 3:
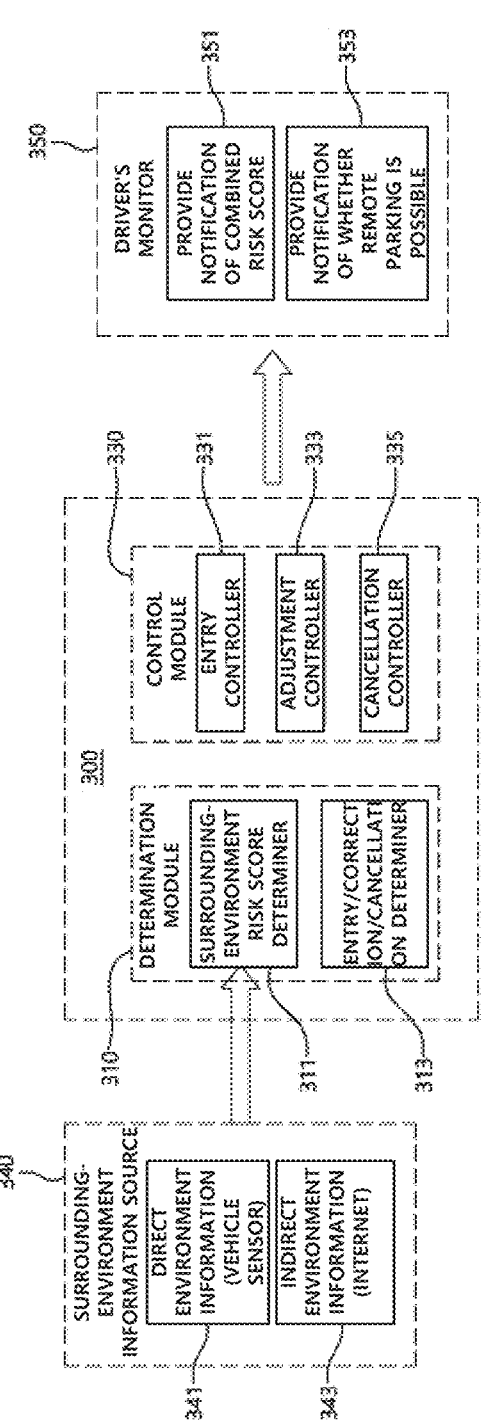
FIG. 3 is a block diagram of an example device for controlling a remote parking assist function.

FIG. 3 is a block diagram of an example device for controlling a remote parking assist function.

Referring to FIG. 3, a device 300 for controlling a remote parking assist function may include a determination module 310 and a control module 330. The device 300 and/or one or more of its components may be implemented with software, hardware, or a combination of both. For example, one or more processors and/or one or more hardware components (e.g., semiconductor devices, field programmable gate arrays (FPGAs), memory, etc.) may be used to implement the features of the device 300 and/or one or more of its components. The device 300 and/or one or more of its components may include memory storing instructions that, when executed by the one or more processors and/or the one or more hardware components, cause the device 300 to perform one or more operations described herein.

The determination module 310 may include a surrounding-environment risk score determiner 311 configured to collect direct environment information and indirect environment information on the place (e.g., location, spot, etc.) where the host vehicle is to be parked from a surrounding-environment information source 340 and generate a parking control function determination command by analyzing the collected information on the surrounding environment, and an entry/adjustment/cancellation determiner 313.

Here, the direct environment information 341 may be collected from a plurality of sensors attached to a vehicle, and the indirect environment information 342 may be collected from a relevant server via the Internet. The direct environment information may include a slope of a road, a road surface condition, information on presence or absence of nearby (e.g., within a threshold distance, within view, etc.) objects, and/or an ambient light condition. The indirect environment information may include weather, temperature, and/or information on risk (e.g., risk factors) associated with a parking location.

The surrounding-environment risk score determiner 311 may collect direct environment information 341 and indirect environment information 342, and determine a combined risk score by adding risk scores set in advance for the direct environment information 341 and risk scores set in advance for the indirect environment information 342.

FIG. 4 is an example of risk scores assigned to the information on the surrounding environment.

Referring to FIG. 4, it can be seen that 1, 2, or 3 points may be assigned based on the steepness of the road slope, the condition of the road surface, the distance between the vehicle and a nearby object, the ambient light condition corresponding to the condition for activation of the vehicle headlights and taillights, the ambient weather, the ambient temperature, and/or the accident history at the parking location.

Although the description has been made by limiting the information on the surrounding environment to seven types and limiting the number of points to three, it is also possible to set the number of types of information on the surrounding environment to more or less than 7 or to set the number of points to more than 3 depending on the embodiment.

The entry/adjustment/cancellation determiner 313 may generate the parking control function determination command requesting that one of an entry control function, an adjustment control function, and a cancellation control function be performed by comparing the combined risk score with a predetermined adjustment score and a predetermined prohibition score.

Here, the entry control function may be configured to activate the remote parking assist function according to a driver's operation, the adjustment control function is configured to activate the remote parking assist function according to a driver's operation in the state in which the rate of increase per unit time of an output torque and the rate of increase per unit time of a braking torque are set differently from when the entry control function is performed, and the cancellation control function is configured to request (e.g., warn, alert, suggest to, recommend to, etc.) a driver to cancel the remote parking assist function requested by the driver. The cancellation control function may be possible in an embodiment of canceling the remote parking assist function.

Figure 5:
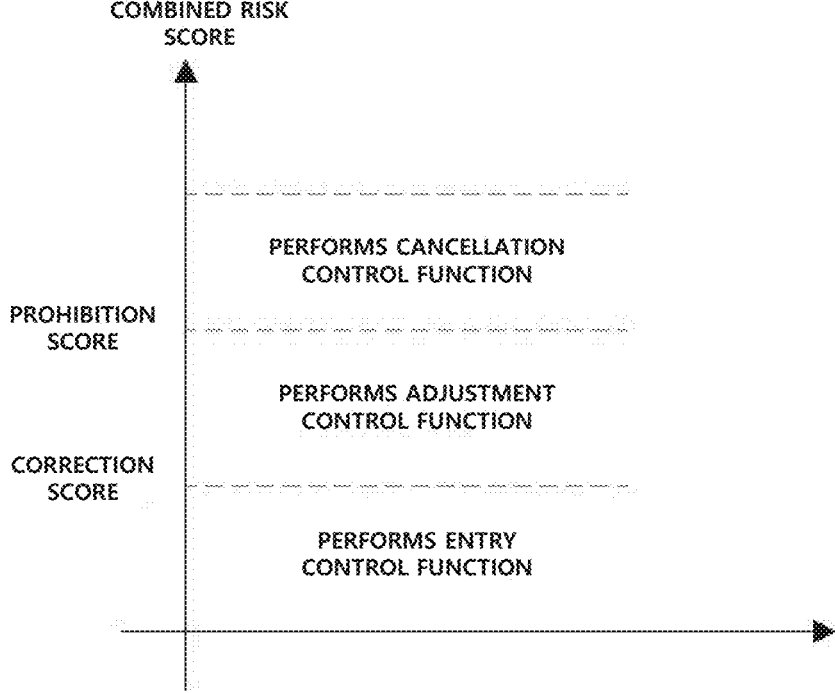
FIG. 5 illustrates example criteria based on which an entry/adjustment/cancellation determiner may make a determination.

FIG. 5 illustrates example criteria based on which the entry/adjustment/cancellation determiner may make a determination.

Referring to FIG. 5, it can be seen that the entry control function may be activated when the combined risk score is less than (e.g., less than or equal to) the adjustment score (e.g., a first threshold value). The adjustment control function may be activated when the combined risk score is greater than (e.g., greater than or equal to) the adjustment score and less than (e.g., less than or equal to) the prohibition score (e.g., a second threshold value), and the cancellation control function may be activated when the combined risk score is greater than (e.g., greater than or equal to) the prohibition score. Here, the adjustment score and the prohibition score may be set differently depending on the vehicle, and the manufacturer of the vehicle or the manufacturer of the device for controlling a remote parking assist function according to the present disclosure may set an initial state value (e.g., adjustment score, prohibition score) suitable for the characteristics of the vehicle. Users may be allowed to adjust the settings (e.g., adjustment score, prohibition score) according to their needs.

The control module 330 may assist in performing the entry control function, the adjustment control function, and/or the cancellation control function, in response to the parking control function determination command. For this purpose, the control module 330 may include an entry controller 331, an adjustment controller 333, and a cancellation controller 335.

The entry controller 331 may perform an entry control function, that is, a remote parking assist function, according to a driver's operation.

The adjustment controller 333 may activate the remote parking assist function according to a driver's operation in the state in which the rate of increase per unit time of the output torque and the rate of increase per unit time of the braking torque are set differently from when the entry control function is performed.

Figure 6:
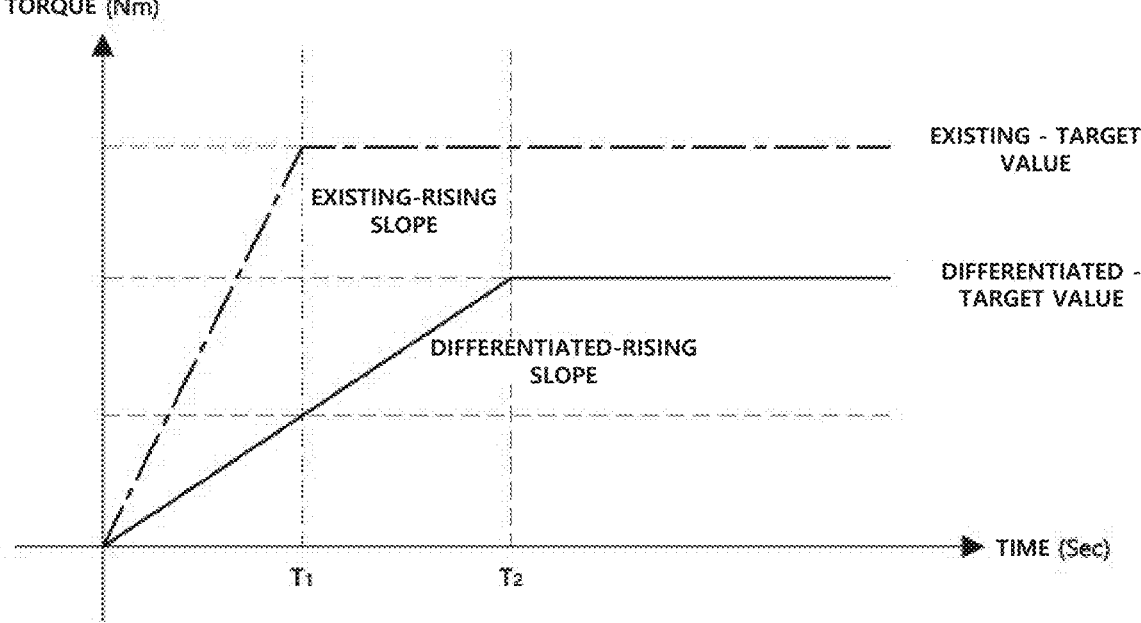
FIG. 6 illustrates example rates of increase unit time of an output torque.

FIG. 6 illustrates example rates of increase per unit time of the output torque.

Figure 7:
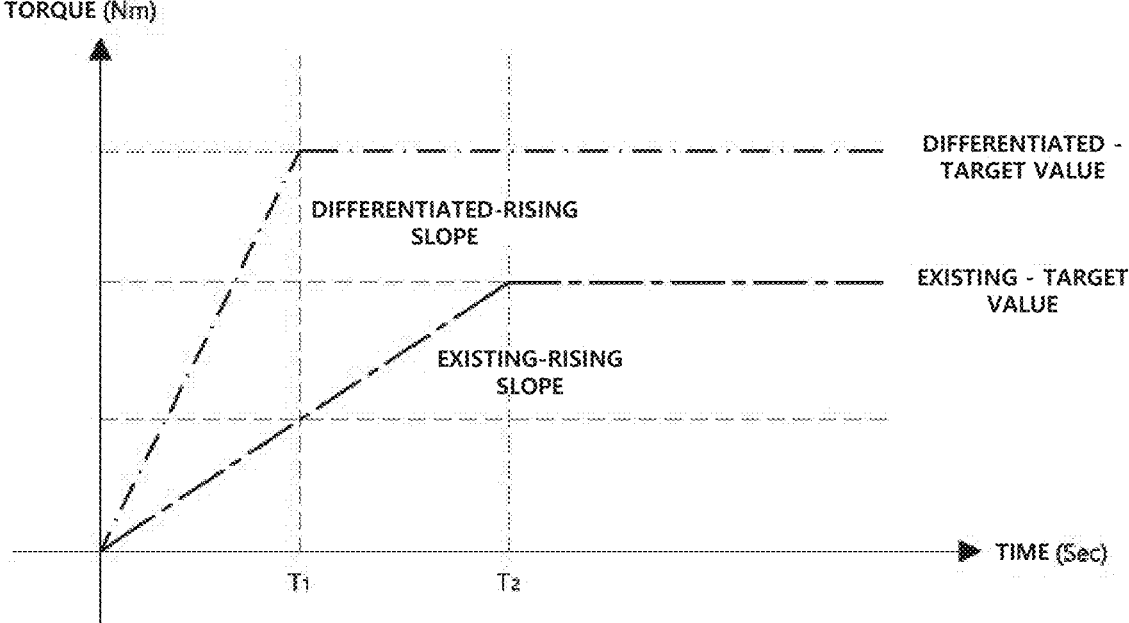
FIG. 7 illustrates example rates of increase per unit time of a braking torque.

FIG. 7 illustrates example rates of increase per unit time of the braking torque.

Referring to FIG. 6, it can be seen that the rate of increase per unit time (e.g., second) of the output torque when the adjustment control function is performed ("differentiated—target value") may be smaller than the rate when the entry control function is performed ("existing—target value"). Referring to FIG. 7, it can be seen that the rate of increase per unit time (e.g., second) of the braking torque when the adjustment control function is performed ("differentiated—target value") may be greater than when the entry control function is performed ("existing—target value"). In other words, when the adjustment control function is performed (e.g., as when the combined risk score is between the adjustment score and the prohibition score), the output torque may rise to a lower target value at a slower rate and the braking torque may rise to a higher target value at a faster rate than they would have when the entry control function is performed (e.g., as when the combined risk score is less than the adjustment score).

The cancellation controller 335 may request a driver to cancel the cancellation control function, that is, the remote parking assist function requested by the driver, or forcibly cancel the function.

The device for controlling a remote parking assist function included in the description of FIGS. 3 to 7 may be a device for performing the method of controlling a remote parking assist function described below.

Figure 8:
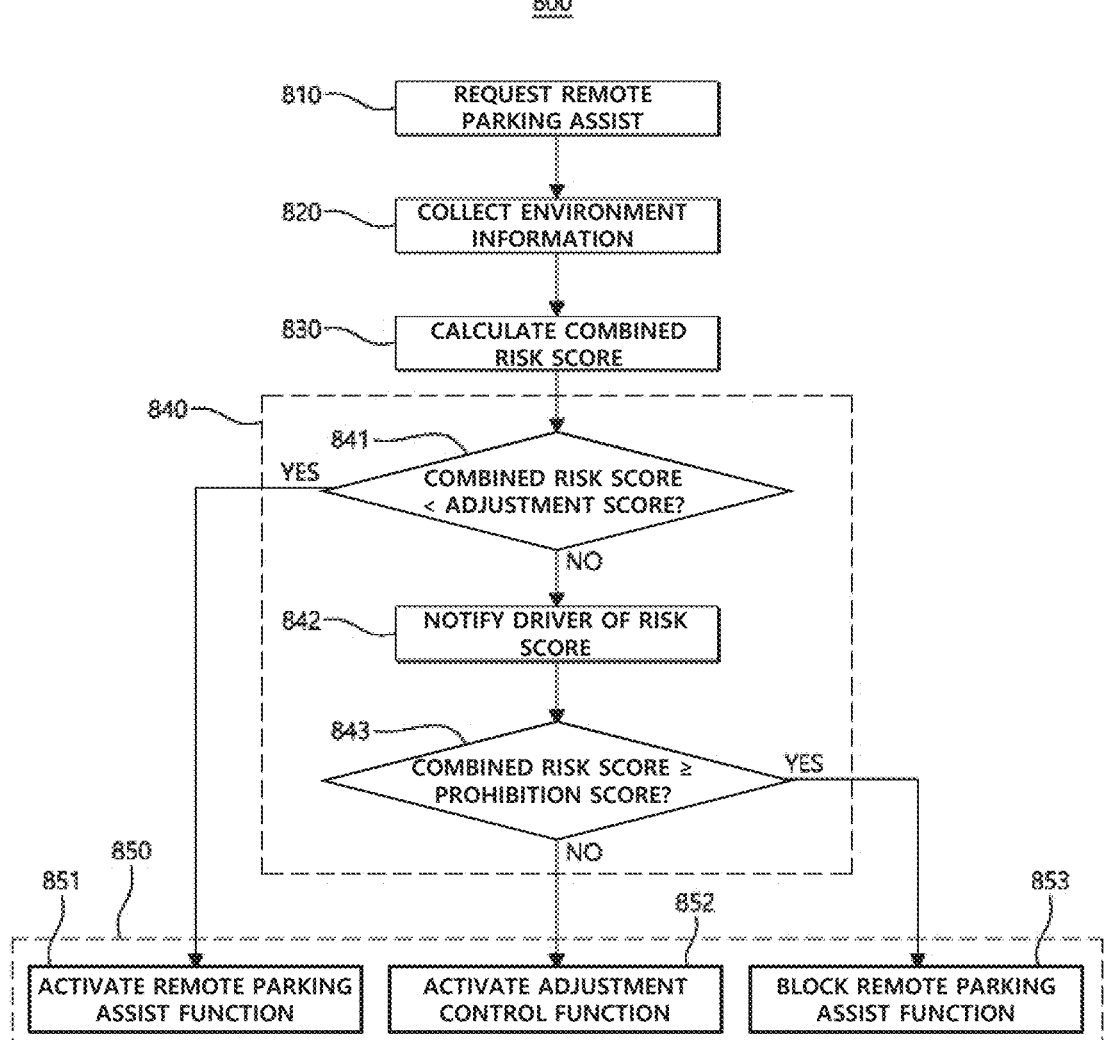
FIG. 8 is a flow diagram of an example method of controlling a remote parking assist function.

FIG. 8 is a flow diagram of an example method of controlling a remote parking assist function. For example, a method 800 may be performed by one or more devices shown in FIG. 3.

Referring to FIG. 8, a method 800 of controlling a remote parking assist function according to the present disclosure may include requesting that a remote parking assist function be performed in step 810, collecting direct environment information and indirect environment information on the place where the vehicle is to be parked from a surrounding-environment information source in step 820, calculating a combined risk score obtained by combining the risk scores assigned to the direct environment information with the risk scores assigned to the indirect environment information in step 830, comparing the combined risk score with a predetermined adjustment score and a predetermined prohibition score in step 840, and assisting in performing at least one of an entry control function, an adjustment control function, and a cancellation control function, in response to the result of comparing the combined risk score with the adjustment score and comparing the combined risk score with the prohibition score in step 850.

Here, the direct environment information may be collected from a plurality of sensors attached to a vehicle, and the indirect environment information may be retrieved via the Internet. For example, the direct environment information may include a slope of a road, a road surface condition, information on presence or absence of a nearby object, and/or the ambient light condition. The indirect environment information may include weather, temperature, and/or information on risk associated with a parking location.

The entry control function may be configured to activate the remote parking assist function according to a driver's operation. The adjustment control function may be configured to activate the remote parking assist function according to a driver's operation in the state in which the rate of increase per unit time of an output torque and the rate of increase per unit time of a braking torque are set differently from when the entry control function is performed, and the cancellation control function is configured to request a driver to cancel the remote parking assist function requested by the driver.

As described above, the adjustment control function is configured to decrease the rate of increase per unit time of the output torque compared to when the entry control function is performed, and to increase the rate of increase per unit time of the braking torque compared to when the entry control function is performed.

The comparing the combined risk score with a predetermined adjustment score and a predetermined prohibition score in step 840 includes determining whether the combined risk score is smaller than the adjustment score in step 841, notifying a driver of the combined risk score in step 842 when it is determined that the combined risk score is greater than the adjustment score (No in step 841), and determining whether the combined risk score is greater than or equal to the prohibition score in step 843 when it is determined that the combined risk score is greater than the adjustment score.

The assisting in performing at least one function in step 850 includes performing the entry control function in step 851 when it is determined that the combined risk score is smaller than the adjustment score (Yes in step 841), performing the cancellation control function in step 853 when it is determined that the combined risk score is greater than or equal to the prohibition score (Yes in step 843), and performing the adjustment control function in step 852 when it is determined that the combined risk score is smaller than the prohibition score (No in step 843).

The device 300 for controlling a remote parking assist function according to the present disclosure may notify a driver of a combined risk score in step 351 or may notify a driver whether remote parking is possible in step 353 through a driver's monitor 350, shown on the right side of FIG. 1.

As described above, the device and the method of controlling a remote parking assist function according to the present disclosure are capable of compensating for the shortcomings of the remote parking assist function by changing the software of the existing controller without adding separate hardware, thereby having advantages of reducing the commercial burden or cost of the vehicle from the perspective of the manufacturer and allowing the driver to park or exit the vehicle more safely without any additional inconvenience. In addition, the present disclosure has advantages in that whether it is possible to enter the remote parking assist function is determined in advance so as to prevent the driver from unnecessarily attempting the remote parking assist function when exiting and parking the vehicle, thereby reducing time waste and improving the convenience with which the remote parking assist function is performed. Moreover, the present disclosure is advantageous in that abnormal behavior of the vehicle may be reduced by differentiating the output torque and the braking torque when attempting remote parking in a place in which it is dangerous to perform the remote parking assist function, and in that a vehicle collision and injury, which may occur due to abnormal vehicle behavior, may be prevented by blocking an unreasonable remote parking attempt in a place where remote parking is not possible.

The present disclosure can be implemented as computer-readable code in media having a program recorded thereon. The computer-readable media include all kinds of recording devices in which data readable by a computer system are stored. Examples of such computer-readable media may include a hard disk drive (HDD), a solid-state drive (SSD), a silicon disk drive (SDD), ROM, RAM, CD-ROM, magnetic tape, a floppy disk, an optical data storage device, and the like.

It will be apparent to those skilled in the art that various modifications and variations can be made in the present disclosure without departing from the spirit or scope of the disclosure. Thus, it is intended that the present disclosure cover such modifications and variations to this disclosure, provided they fall within the scope of the appended claims and their equivalents.

What is claimed is:

1. A device for controlling a remote parking assist function, the device comprising:

one or more processors; and memory storing instructions that, when executed by the one or more processors, are configured to cause the device to:

collect direct environment information and indirect environment information on a parking location;

determine a combined risk score by combining at least one risk score assigned to the direct environment information and at least one risk score assigned to the indirect environment information; and cause activation of:

an entry control function by activating, based on the combined risk score being less than a predetermined adjustment score, the remote parking assist function, according to an operation of a driver, at a first output torque increase rate per unit time and at a first braking torque increase rate per unit time, an adjustment control function by activating, based on the combined risk score being greater than the predetermined adjustment score and being less than a predetermined prohibition score, the remote parking assist function, according to the operation of the driver, at a second output torque increase rate per unit time and at a second braking torque increase rate per unit time, wherein the second output torque increase rate per unit time is different from the first output torque increase rate per unit time, and wherein the second braking torque increase rate per unit time is different from the first braking torque increase rate per unit time, and a cancellation control function by requesting, based on the combined risk score being greater than the predetermined prohibition score, the driver to cancel the remote parking assist function.

2. The device according to claim 1, wherein the direct environment information is collected by a plurality of sensors of a vehicle, and the indirect environment information is collected from a server via an Internet.

3. The device according to claim 2, wherein:

the direct environment information includes at least one of a slope of a road, a road surface condition, information on presence or absence of a nearby object, or an ambient light condition, and the indirect environment information includes at least one of weather, temperature, or information on risk associated with the parking location.

4. The device according to claim 1, wherein the predetermined adjustment score and the predetermined prohibition score are set based on one or more characteristics of a vehicle.

5. The device according to claim 1, wherein the second output torque increase rate per unit time is less than the first output torque increase rate per unit time, and wherein the second braking torque increase rate per unit time is greater than the first braking torque increase rate per unit time.

6. The device according to claim 1, wherein the instructions, when executed by the one or more processors, cause the device to determine the combined risk score by adding the at least one risk score assigned to the direct environment information to the at least one risk score assigned to the indirect environment information.

7. The device according to claim 1, wherein the instructions, when executed by the one or more processors, further cause the device to:

adjust, based on a user input, at least one of the predetermined adjustment score or the predetermined prohibition score.

8. The device according to claim 1, wherein the instructions, when executed by the one or more processors, further cause the device to provide, to the driver, a notification of the combined risk score.

9. A method comprising:

receiving a request that a remote parking assist function be performed;

collecting direct environment information and indirect environment information on a parking location;

determining a combined risk score by combining at least one risk score assigned to the direct environment information with at least one risk score assigned to the indirect environment information; and causing activation of:

an entry control function by activating, based on the combined risk score being less than a predetermined adjustment score, the remote parking assist function, according to an operation of a driver, at a first output torque increase rate per unit time and at a first braking torque increase rate per unit time, an adjustment control function by activating, based on the combined risk score being greater than the predetermined adjustment score and being less than a predetermined prohibition score, the remote parking assist function, according to the operation of the driver, at a second output torque increase rate per unit time and at a second braking torque increase rate per unit time, wherein the second output torque increase rate per unit time is different from the first output torque increase rate per unit time, and wherein the second braking torque increase rate per unit time is different from the first braking torque increase rate per unit time, and a cancellation control function by requesting, based on the combined risk score being greater than the predetermined prohibition score, the driver to cancel the remote parking assist function.

10. The method according to claim 9, wherein the direct environment information is collected by a plurality of sensors attached to a vehicle, and the indirect environment information is collected from a server via an Internet.

11. The method according to claim 10, wherein:

the direct environment information includes at least one of a slope of a road, a road surface condition, information on presence or absence of a nearby object, or an ambient light condition, and the indirect environment information includes at least one of weather, temperature, or information on risk associated with the parking location.

12. The method according to claim 9, wherein the predetermined adjustment score and the predetermined prohibition score are set based on one or more characteristics of a vehicle.

13. The method according to claim 9, wherein the second output torque increase rate per unit time is less than the first output torque increase rate per unit time, and wherein the second braking torque increase rate per unit time is greater than the first braking torque increase rate per unit time.

14. The method according to claim 9, further comprising:

determining whether the combined risk score is less than the predetermined adjustment score; and based on a determination that the combined risk score is greater than the predetermined adjustment score, determining whether the combined risk score is greater than or equal to the predetermined prohibition score.

15. The method according to claim 9, further comprising:

adjusting, based on a user input, at least one of the predetermined adjustment score or the predetermined prohibition score.

16. The method according to claim 9, further comprising notifying the driver of the combined risk score.

17. A device for controlling a remote parking assist function, the device comprising:

one or more processors; and memory storing instructions that, when executed by the one or more processors, are configured to cause the device to:

collect direct environment information and indirect environment information on a location, wherein a type of the direct environment information is different from a type of the indirect environment information;

determine a combined risk score by combining at least one risk score assigned to the direct environment information and at least one risk score assigned to the indirect environment information; and cause activation of:

an entry control function by activating, based on the combined risk score being less than a predetermined adjustment score, the remote parking assist function, according to an operation of a driver, at a first output torque increase rate per unit time and at a first braking torque increase rate per unit time, an adjustment control function by activating, based on the combined risk score being greater than the predetermined adjustment score and being less than a predetermined prohibition score, the remote parking assist function, according to the operation of the driver, at a second output torque increase rate per unit time and at a second braking torque increase rate per unit time, wherein the second output torque increase rate per unit time is different from the first output torque increase rate per unit time, and wherein the second braking torque increase rate per unit time is different from the first braking torque increase rate per unit time, and a cancellation control function by requesting, based on the combined risk score being greater than the predetermined prohibition score, the driver to cancel the remote parking assist function.

18. The device of claim 17, wherein the remote parking assist function comprises the entry control function, the adjustment control function, and the cancellation control function.

19. The device of claim 17, wherein the direct environment information and the indirect environment information indicate parking environment associated with the location.

\* \* \* \* \*